United States Patent [19]
Meinerding

[11] Patent Number: 5,515,670
[45] Date of Patent: May 14, 1996

[54] ROTARY MOWER BLADE

[76] Inventor: Wesley C. Meinerding, 1019 Knollwood, NW., Canton, Ohio 44708

[21] Appl. No.: 207,564

[22] Filed: Mar. 7, 1994

Related U.S. Application Data

[63] Continuation-in-part of Ser. No. 943,021, Oct. 9, 1992, Pat. No. 5,291,725, which is a continuation-in-part of Ser. No. 812,829, Dec. 24, 1991, Pat. No. 5,167,109.

[51] Int. Cl.$^6$ .......................... A01D 34/73; A01D 34/64
[52] U.S. Cl. ................ 56/295; 56/DIG. 17; 56/DIG. 20
[58] Field of Search .................... 56/295, 255, DIG. 20, 56/DIG. 17

[56] References Cited

U.S. PATENT DOCUMENTS

| | | | |
|---|---|---|---|
| 2,697,323 | 12/1954 | Horn | 56/295 |
| 2,786,318 | 3/1957 | Caldwell et al. | 55/118 |
| 2,857,729 | 10/1958 | Zoldok | 56/295 |
| 2,924,059 | 2/1960 | Beeston, Jr. | 56/295 |
| 3,162,990 | 12/1964 | Cook | 56/295 |
| 3,320,733 | 5/1967 | Kirk | 56/295 |
| 3,485,022 | 12/1969 | Freedlander et al. | 56/295 |
| 3,538,692 | 11/1970 | Cope et al. | 56/295 |
| 3,717,985 | 2/1973 | Freedlander et al. | 56/295 |
| 3,762,138 | 10/1973 | Michael | 56/295 |
| 3,998,037 | 12/1976 | Deans et al. | 56/295 |
| 4,079,578 | 3/1978 | Cornellier | 56/295 |
| 4,149,358 | 4/1979 | Comer | 56/295 X |
| 4,297,831 | 11/1981 | Pioch | 56/295 |
| 4,320,617 | 3/1982 | Fedeli | 56/295 |
| 4,429,518 | 2/1984 | Fedeli | 56/295 |
| 4,578,938 | 4/1986 | Genesco | 56/295 |
| 4,715,173 | 12/1987 | Anderson | 56/295 |
| 5,036,654 | 8/1991 | Malutich | 56/255 |
| 5,056,605 | 10/1991 | Bond et al. | 172/111 |

*Primary Examiner*—Stephen J. Novosad
*Attorney, Agent, or Firm*—Renner, Kenner, Greive, Bobak, Taylor & Weber

[57] ABSTRACT

A rotary lawn mower blade has a plurality of shredders with cutting edges affixed to the blade. The shredders provide additional cutting edges for fine shredding of vegetation. These shredders may be bolted, welded or cut out of the blade. A ridge is provided for aiding the grass clippings to drop to the ground.

18 Claims, 8 Drawing Sheets

ROTARY MOWER BLADE

This is a continuation-in-part of an application, Ser. No. 07/943,021 filed on Oct. 9, 1992, now U.S. Pat. No. 5,291,725, which is a continuation-in-part of an application, Ser. No. 07/812,829 filed on Dec. 24, 1991, now U.S. Pat. No. 5,167,109.

TECHNICAL FIELD

This invention relates to an improved rotary mower blade having a plurality of small cutters, hereinafter referred to as shredders, affixed thereto for shredding vegetation such as grass, leaves or brush, to fine pieces. More particularly, this invention relates to a solid rotary mower blade having affixed thereunder, thereabove or a combination thereof, a plurality of cutter blades, arranged along the length of the rotary blade, to provide additional cutting edges which accomplish fine shredding of vegetation.

Power rotary lawn mowers, ordinarily used for cutting grass, have been recognized as a convenient means of collecting leaves and thin twigs. According to the U.S. Environmental Protection Agency (EPA), from 18% to 20% of landfill volume is used for the disposal of grass and leaves. It costs municipalities as much as $200 per ton to dispose of grass and leaves. The EPO further states that landfill disposal of grass and leaves will be prohibited in December 1993.

Fine shredding and composting of the finely-shredded vegetation in private gardens and on municipal compost piles is therefore desirable, yielding valuable humus for soil enrichment.

BACKGROUND ART

Many improvements have been made on rotary lawn mower blades to facilitate mowing or shredding, such as filaments and plastic discs with serrated peripheries. Some of the improved blades are disclosed in the following patents:

U.S. Pat. No. 4,706,446 discloses a rotary lawn mower having double cutting units, the upper one rotary and the lower one stationary. The two units are concentrically mounted and provided with cutting blades in the adjacent planes of the units such that the blades of the upper rotating unit act as shears against the lower stationary blades.

U.S. Pat. No. 2,917,826 discloses a disc of a lawn trimmer having pocket-like attachments with sharp edges, for edging grass along a side walk or flower bed while the disc is held with its edge perpendicular to the soil.

U.S. Pat. No. 5,056,605 relates to a multipurpose disc cutter having sharp saw teeth around its periphery, pointing upward and downward.

U.S. Pat. No. 4,270,271 discloses a trimmer having two discs concentrically held apart from each other so as to accommodate pivotally mounted and removable blades therebetween.

U.S. Pat. No. 4,295,274 relates to a floor scraper having a disc and a plurality of leaf spring strips having the shape of a Z, each mounted on the disc circumference at one end, the other end of the Z strip being equipped with a flat metal cutter having a front cutting edge facing in the direction of rotation of the disc, the rear side of the cutter being at a slight angle with respect to the plane of the disc.

U.S. Pat. Nos. 4,577,382 and 3,176,455 disclose rotary disc blades or bar blades with saw teeth with different orientations and additional apertures on the disc having one lateral edge as cutting edge so as to increase the cutting rate.

U.S. Pat. No. 5,063,731 relates to brush and tree cutter blades having three spring loaded teeth or slicing blades mounted on the periphery of the hinged blades such that if the teeth hit a hard surface, the teeth will retract within their cages and the blades will deflect upward or downward to avoid damage to the blades and saw teeth.

It is evident that the prior art has not addressed the problem of shredding vegetation into fine pieces during the mowing of lawns so as to speed the decomposition of the cuttings in contact with soil or in a compost pile.

DISCLOSURE OF THE INVENTION

The rotary mower blade of this invention allows grass clippings, leaves and twigs to be finely shredded, to be greatly reduced in bulk volume, and to decompose rapidly on the ground or in a compost pile. It is the object of this invention to provide a simple and economical rotary blade with at least one row of longitudinally spaced shredders attached on the underside, upper side, or a combination of both, of the rotary blade so as to provide a multitude of additional cutting edges. A further object is to provide shredders both above and below the rotary brush blade to accomplish fine shredding of vegetation.

The advantages and feature of the improved rotary blade will be apparent from reading of the detailed description of the preferred embodiments in conjunction with the drawings.

PREFERRED EMBODIMENT FOR CARRYING OUT THE INVENTION

Figure 1:
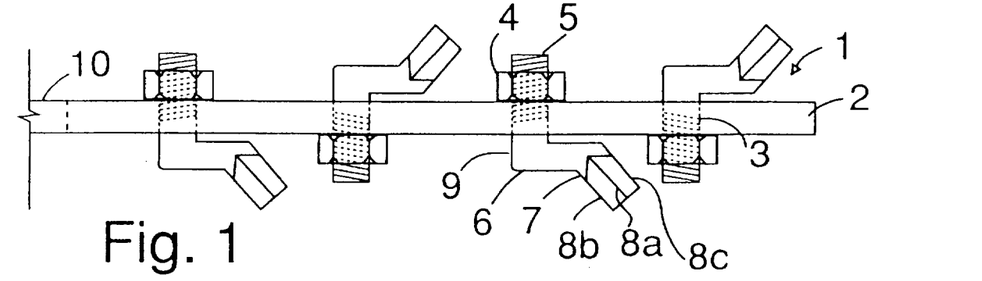
FIG. 1 is a side elevation of a rotary blade with a row of shredders with cutting edges.

Referring to FIG. 1, a rotary lawn mower blade generally denoted by 1, has a central bore 10, for attachment to a motor shaft. Only half of the blade is shown, the other half being a mirror image of the portion of the blade shown in this drawing. Blade 1 may be made of steel or hard plastic, such as polycarbonate, and may have a variety of shapes including that of a disc or a bar with a leading edge and trailing up-lift wing. On blade 1, there is provided a row of apertures, 3, radiating from the central bore to the periphery of the blade. Into each of these apertures 3, an upper arm 5 of a shredder 9 is inserted. The upper arm 5, which is threaded at its upper extremity is secured by a lock nut 4. The diameter of arm 5 is slightly smaller than that of the aperture 3. The shredder 9 is thus free to rotate with respect to the rotary blade, 2. In an alternative embodiment, the arm 5 is rigidly fastened to the rotary blade, 2.

The shredders 9 are replaceable and generally fastened to the underside of the blade 1. Each shredder is made of a metal bar, such as carbon steel, ⅛" to ¼" in diameter bent twice at approximately right angles to the horizontal arm 6 so as to have an upper vertical arm 5, a horizontal arm 6 connected thereto, and a lower vertical arm 7 connected to the horizontal arm 6. The arms 5, 6, and 7 form an integral part. The angle between arms 5 and 6 is preferably about 90 degrees; however, a slight deviation from a right angle is acceptable. The angle formed by the arm 7 and the interconnecting arm 6 is preferably from 90 to 135 degrees. The length of the lower arm 7 should be about ½ to 1". The lower arm 7 and has at least one cutting edge along its vertical axis.

The lower arm 7 is preferably provided with several longitudinal cutting edges such as three sharpened cutting edges 8a, 8b and 8c as shown, by grinding the lower arm such that it has the cross section of an equilateral triangle.

Since the shredder is able to rotate freely with respect to the rotary blade, the lower arm does not sustain damage when it hits a stone. Therefore, the mower may be adjusted such that the lower extremities of the shredders are relatively close to the ground to provide maximum shredding action. The shredders are preferably made of carbon steel; alternatively, they may be moulded from a hard plastic such as polycarbonate.

The arrangement of the shredders on the rotary blade is preferably in a row radiating outward from the center of the rotary blade, as shown in FIG. 1 (only two shredders are shown for clarity).

Figure 2:
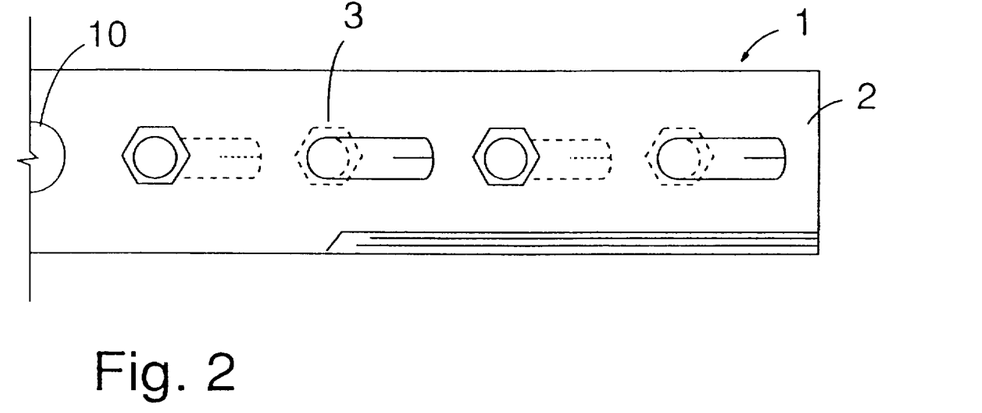
FIG. 2 is a plan view of the arrangement of shredders on a rotary blade.

Alternatively, as shown in FIG. 2, the shredders may be placed in two or more rows radiating from the center of the blade, or parallel to each other, at equal distances from each other and staggered from row to row.

Figure 3A:
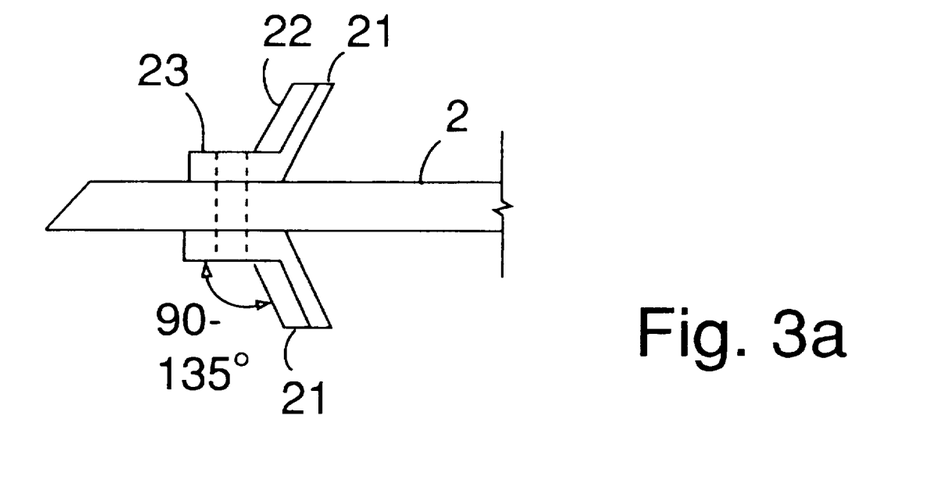
FIGS. 3a, 3b, and 3c illustrate another embodiment of the shredders.
Figure 3B:
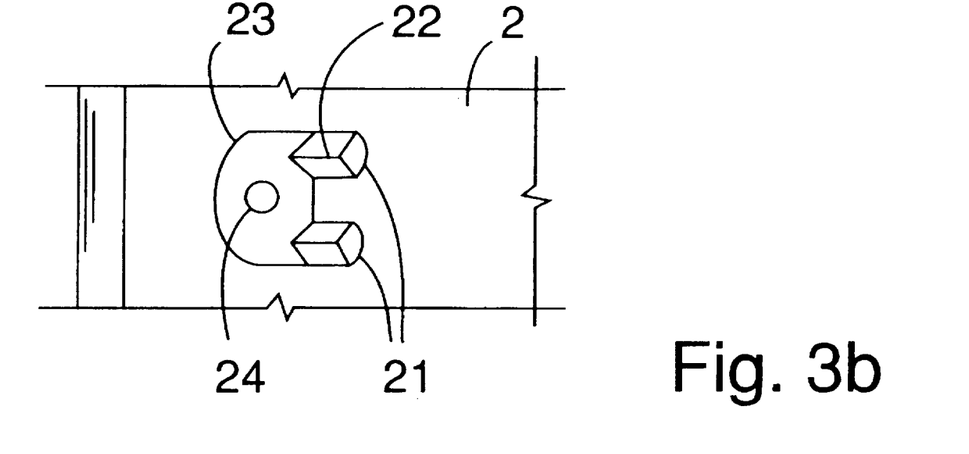
Figure 3C:
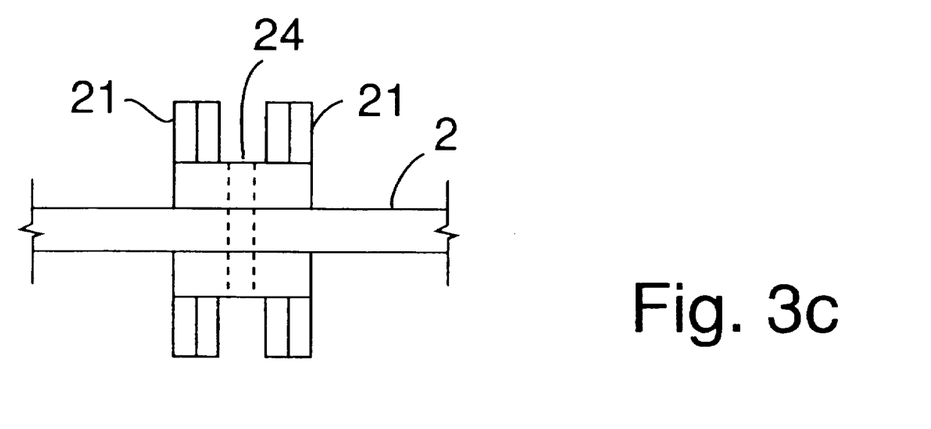

In another embodiment, the shredder is made generally in the shape of a U as illustrated in FIGS. 3a, b, and c. Two arms 21 have longitudinal cutting edges, 22 and the interconnecting member 23 has an opening 24 through which the shredder is secured to the rotary blade by means of a bolt and lock nut (not shown). The arms 21 extend away from the interconnecting member 23 at an angle of 90 to 135 degrees as best seen in FIG. 3a which is side view of the two shredders being fastened above and below the blade.

FIG. 3b is a plan view of this shredder which shows the two arms 21 having longitudinal cutting edges extending from the plane of connecting member 23 and blade 2. The extending shredder arms may be ground to have several longitudinal cutting edges as explained above. The shredder is attached to the rotary mower blade such that at least one of its cutting edges 22 points into the direction of motion as the mower blade rotates.

The shredders as described may be mounted only above or only below the rotary blade.

In all the above embodiments of the invention, the shredders may be restrained from rotating with respect to the rotary blade by means of square apertures on the blade and shredders and bolts having square shanks, such as carriage bolts, and lock nuts.

Figure 4A:
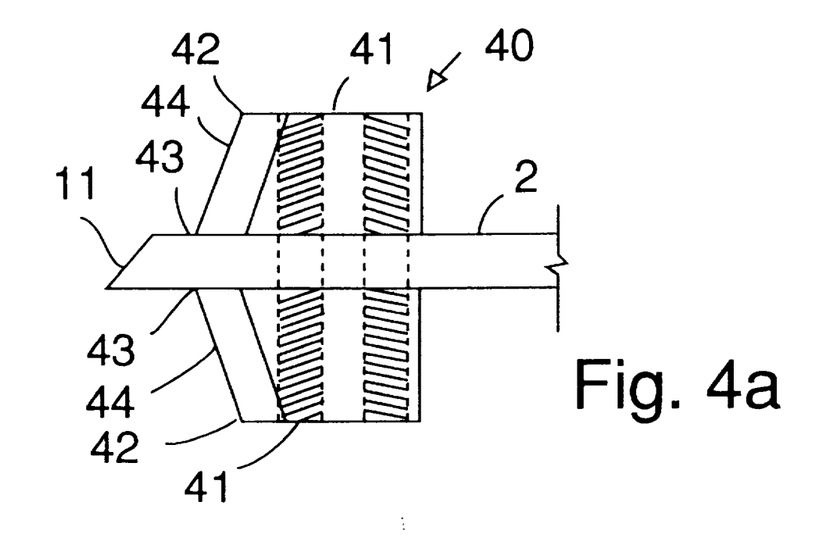
FIGS. 4a and 4b illustrate a shredder for a brush cutter blade including the shredders of this invention.
Figure 4B:
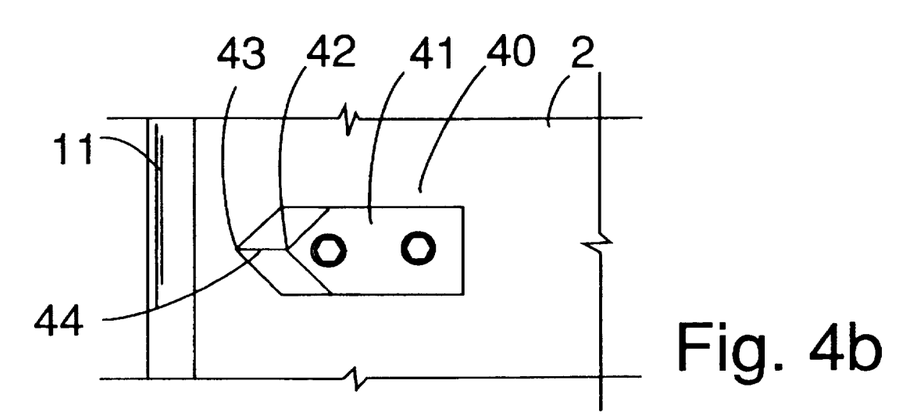

The shredder of this invention furthermore is useful as a brush cutter. Brush cutters generally have pivotally mounted blades to avoid damage by rocks, and the blade length varies from 15" to 24" depending on the size of cutter. FIG. 4b is a plan view of the shredder of this invention for brush cutters. The shredder 40 is a five-sided trapezoidal solid steel block about ¼" to ½" thick. The shredder is about 1"–2" long and ½" wide. The top surface 41 has a point 42 which is recessed with respect to its corresponding lower point 43 of the bottom surface (not shown). From point 42 to point 43 is an inclined cutting edge 44. The shredders are spaced along the cutting edge or leading edge 11, of the blade and on the upper side of the brush cutter blade 2, with the cutting edge 44 perpendicular to the cutting edge 11. The shredders may also be fixed on the underside of the cutter blade. Alternatively, shredders are fastened to the rotary blade in pairs, one shredder above the blade aligned with one below the blade, their mounting holes lining up and the blades being held in place by common bolts or pins having matching holes corresponding to those of the shredders. A roll pin or a split pin may be used. The number of shredders may be as high as six pairs on each half of the rotary blade. The number of cutting edges may thus be increased twelve-fold.

Figure 5:
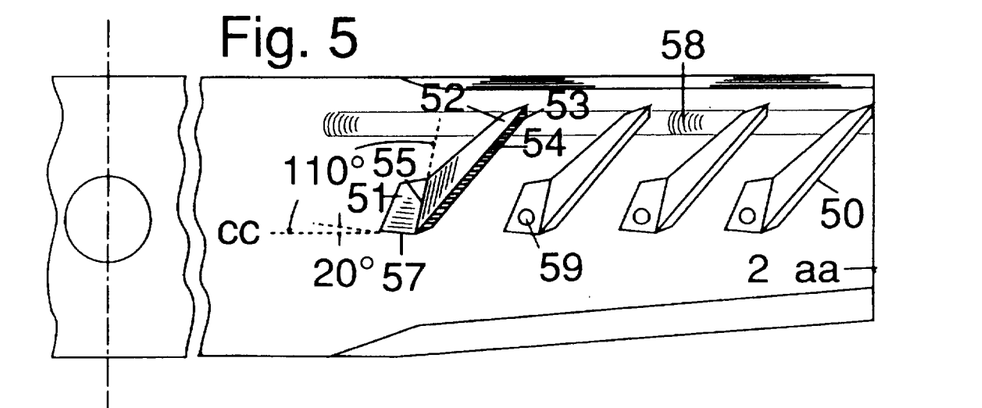
FIG. 5 is a plan view of shredders welded or fastened onto a rotary blade.
Figure 6:
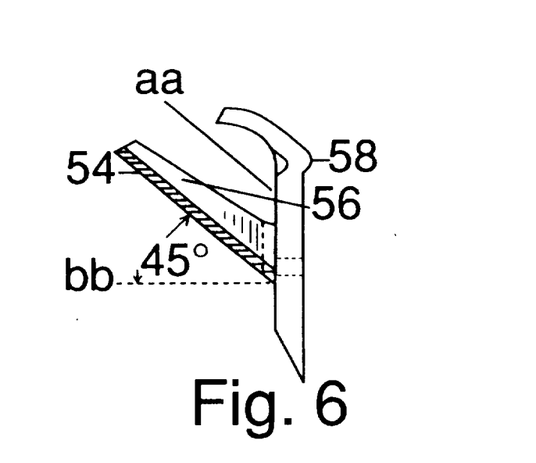
FIG. 6 is an end view of a welded or fastened shredder.
Figure 7:
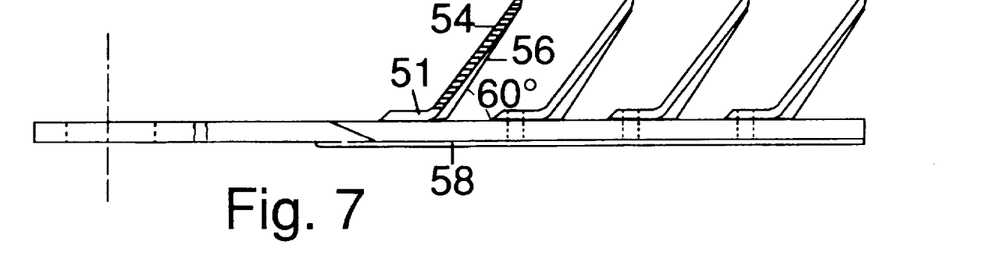
FIG. 7 is an elevation of a welded or fastened shredders.

In another embodiment, the shredders are fabricated from metal plate of about one eighth (⅛") inch thickness and bent at an angle to form an inclined plate. Referring to FIG. 5, the shredder 50, is provided with a base 51, which may be rectangular but is not limited to such configuration; and connected to the base 51 is an outwardly inclined plate having a front face 52 and a back face 56. The plate forms a 60-degree angle with respect to the surface of the blade 2, as shown in FIG. 7. A front edge 54 of the shredder 50 is ground at a bevel, as shown in FIGS. 5, 6, and 7, to form a sharp cutting edge. Edge 54 slants rearward and is at a 45 degree-angle with respect to end 22 of the blade 2. As shown in FIG. 7, a portion of the rear edge of the blade 2 is slightly curved upward. As seen in FIG. 6, the edge 54 is at 45-degree angle with respect to the lawn mower blade end, aa, or the surface of the blade or with reference to a line bb, perpendicular to the surface of the blade 2 at the base of the inclined plate. As shown in FIG. 5, an intersecting line 55 between base 51 and face 52 is set on the blade at an angle of about 110 degrees with respect to a reference line, cc, which is perpendicular to the end aa of blade 2. To show the orientation of intersecting line 55 in another way, the front edge 57 of the base 51 is at an angle of about 20 degrees from the reference line cc.

The shredders are first spot welded onto the mower blade and then MIG welded all around. They may alternatively be provided with holes 59 for fastening the shredders to the blade with bolts and nuts. The shredders may be arranged in a row as shown, or they may be arranged in two rows.

Figures 8, 10:
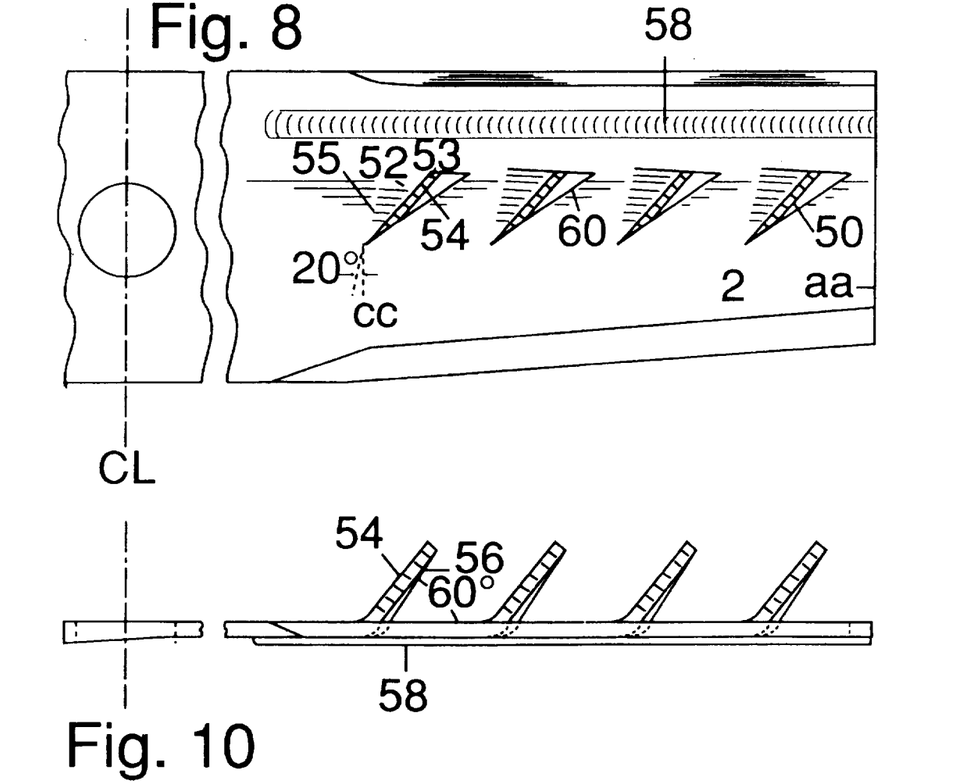
FIG. 8 is a plan view of shredders cut out from the main blade.
FIG. 10 is an elevation of FIG. 8.
Figure 9:
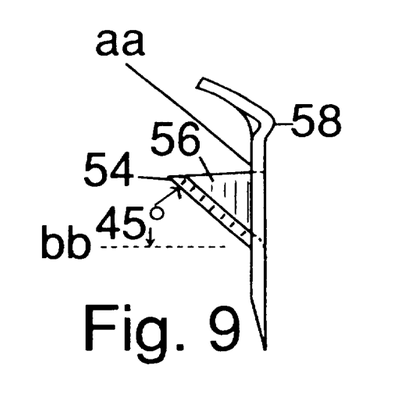
FIG. 9 is an end view of FIG. 8.

In yet another embodiment, the shredders 50 may be constructed from the blade itself as shown in FIGS. 8, 9, and 10. Shredders 50 are cut from blade 2 and bent upward, similar to the configurations shown in FIGS. 5, 6, and 7. As shown in FIG. 8, shredder 50 has an inclined plate with a front face 52 being contiguous with blade 2, but in a different plane. A back face 56, and front face 52 form a front cutting edge 54. Bending the shredders upward as shown leaves triangular openings 60 in the mower blade.

FIG. 10 is an elevation of FIG. 8 showing face 56, which is inclined outwardly at a 60-degree angle with respect to the surface of the blade; the cutting edge 54 slants rearward and is at a 45-degree angle with respect to the end aa of the mower blade as shown in FIG. 9 or at a 45-degree angle with respect to reference line bb at the line of intersection 55. The face 52 is oriented at an angle such that the line of intersection 55 of the planes of the mower blade and that of the shredder is at a 20-degree angle with respect to a vertical line cc to the edge of the blade 2.

In addition to the latter two improvements above, elongated ridges 58 on the bottom surfaces of the blades 2 are provided, parallel to and near the rear edges of the blades, to provide brushing action causing the grass blades to straighten, to part the grass blades, and to allow the grass clippings to fall to the ground between the grass blades rather than settle on top of the cut grass. The ridges 58 may be extended inwardly from the end of the blades to at least the mid-point between the ends of the blades and the center. The ridges 58 are formed by deforming the metal of the blades so as to form ridges on the lower surfaces and concave grooves on the upper surfaces thereof.

Another mower blade embodiment according to the concepts of the present invention is depicted in FIGS. 11–14, inclusive, of the drawings. In this instance, the blade 101 includes a plurality of shredders, generally indicated by the numeral 150, which are located within the blade 101 and may be generally similar to the shredders 50, as shown and described in conjunction with the embodiment of the invention of FIGS. 8–10.

Figure 11:
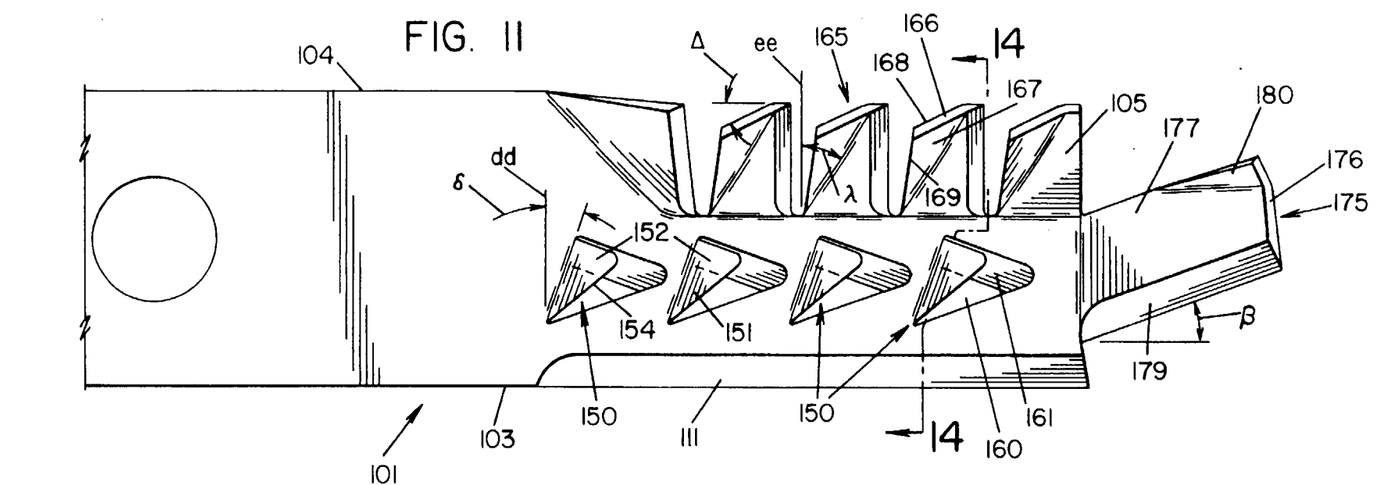
FIG. 11 is a fragmentary plan view of a rotary blade according to a further embodiment of the present invention having blade end shredders and shredders positioned on the air deflector at the trailing edge of the blade.
Figure 12:
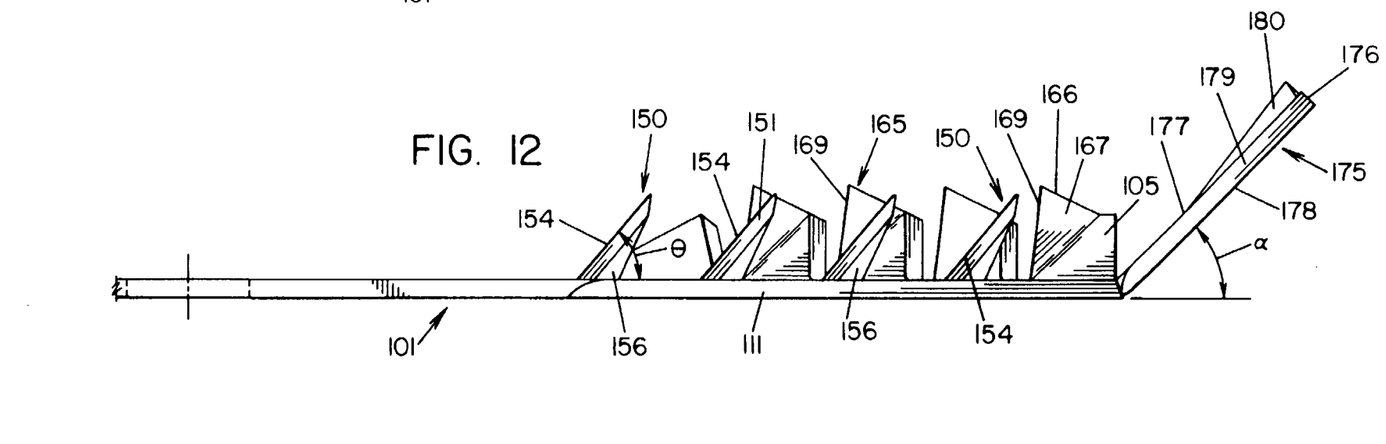
FIG. 12 is a front elevational view of the rotary blade of FIG. 11 showing details of the shredders.
Figure 13:
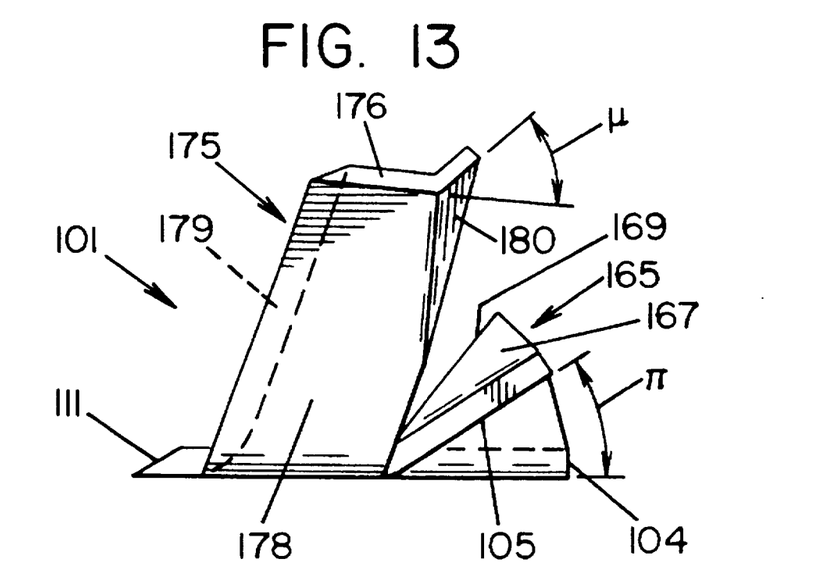
FIG. 13 is an end elevational view of the rotary blade of FIG. 11 showing additional details of the shredders.

In particular, the shredders 150 are constructed from the blade itself, as seen in FIGS. 11–14. More particularly, the shredders 150 are cut from the blade 101 itself at a location rearwardly of the conventional cutting edge 111. As seen in FIGS. 11 and 12, each shredder has an inclined plate 151 with a front face 152 contiguous with the blade 101 but lying in a different plane. A back face 156 of plate 151, together with front face 152, terminate in the direction of the leading edge 103 of blade 101 in the formation of an angled front cutting edge 154.

FIG. 12 shows plate 151 inclined outwardly toward the proximate end of the blade 101 and upwardly at an angle θ of approximately 60 to 70 degrees with respect to the surface of the blade 101. It will be appreciated that the plate 151 could also be inclined inwardly and upwardly toward the center of the blade 101 and thus in either direction generally longitudinally of the blade 101. The cutting edge 154 slants upwardly and rearwardly toward the trailing edge 104 of the blade 101 and is at an angle ε of approximately 45 degrees with respect to the plane of the blade 101. The face 152 is oriented at an angle δ of approximately 20 degrees with respect to a line dd perpendicular to the edges 103, 104 of the blade 101.

Figure 14:
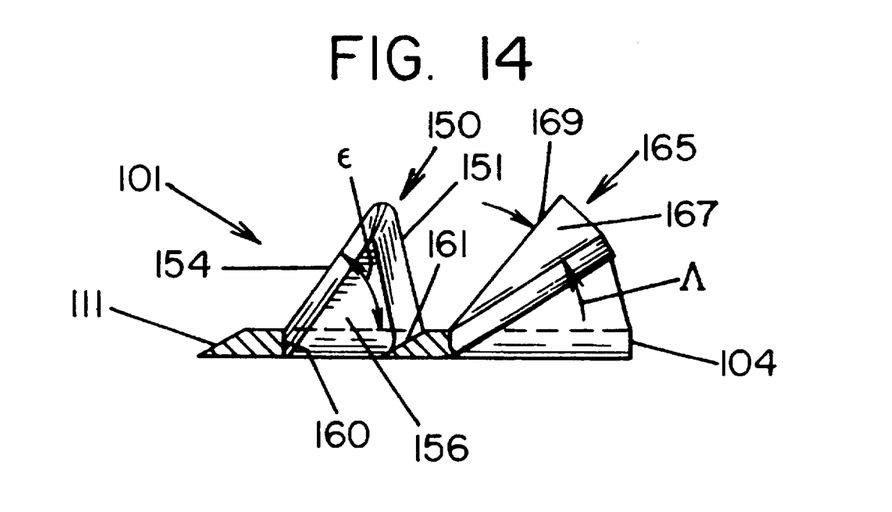
FIG. 14 is a cross-sectional view of the blade of FIG. 11 taken substantially along the line 14—14 of FIG. 11 and showing details of shredders positioned medially between the leading and trailing edges of the blade.

Bending the plates 155 upwardly to the permanent operating position leaves triangular openings 160 in the mower blade 101 adjacent to the inclined plates 151. As best seen in FIG. 14, the trailing surface of the opening 160, which is closest to the back or trailing edge 104 of the blade 101, may be provided with a shaving cutter 161 which lies in the plane of the blade 101 and may be positioned at an angle of approximately 20 degrees to a line paralleling the edges 103, 104 to provide a further cutting surface. The shaving cutter 161 may be formed by cutting the plates 151 at the specified angle or by making a perpendicular cut and subsequently grinding and finishing to form the shaving cutter 161 at an appropriate angle.

In addition to the shredders 150, the blade 101 may be provided with a second row of shredders, each generally indicated by the numeral 165. The shredders 165 may be positioned in the plane of the blade 101 or formed in an air deflector 105 positioned in the trailing edge 104 of the blade 101. The air deflector 105 may be a substantially planar or slightly curved, integral strip portion of the blade 101 which extends a distance longitudinally from the end to a position substantially at or inwardly of the shredders 165. The air deflector 105 may be positioned at an upward angle π of approximately 30 to 40 degrees to the plane of the blade 101 to divert air and shredded particles upwardly.

As shown in FIGS. 11–14, the shredders 165 are constructed from the blade 101. Each shredder 165 has an inclined plate 166 with a front face 167 contiguous with the air deflector 105 but lying in a different plane. A back face 168 of plate 166, together with the front face 167, terminate in the direction of leading edge 103 of blade 101 in the formation of an angled cutting edge 169. The cutting edges 154 of shredders 150 may be positioned intermediate the cutting edges 169 of shredders 165 in regard to their position longitudinally of the blade 101.

Each plate 166 is inclined inwardly toward the center of the blade 101 and upwardly at an angle Δ of approximately 30 degrees with respect to the plane of the air deflector 105. It will be appreciated that the plate 166 could also be inclined outwardly and upwardly toward the proximate end of the blade 101. The cutting edge 169 slants upwardly and rearwardly toward the trailing edge 104 of the blade 101 and is at an angle Λ of approximately 30 degrees with respect to the plane of the air deflector 105. The face 167 of plate 166 is oriented at an angle λ of approximately 20 to 30 degrees with respect to a line ee perpendicular to the edges 103 and 104 of the blade 101.

It will be understood that the combination of shredders 165 and shredders 150 provides the possibility of a substantially greater number and extent of cutting edges to intensify the shredding action taking place on particles severed by the conventional cutting edge 111 and shaving cutter 161 of the blade 101.

In addition to the shredders 150, 165, the blade 101 of the embodiment of FIGS. 11–14 may be provided with an outboard cutter, generally indicated by the numeral 175. The outboard cutter 175 may be attached to or preferably formed from the end portions of blade 101 itself. As seen, each outboard cutter 175 has an inclined plate 176 with a front face 177 shown contiguous with the blade 101 but lying in a different plane. A back face 178 of plate 176, together with front face 177, terminate in the direction of the leading edge 103 of blade 101 in the formation of an angled front cutting edge 179.

Plate 176 is inclined upwardly and outwardly of blade 101 at an angle α of approximately 45 degrees relative to the plane of the blade 101. The cutting edge 179 may also recess outwardly rearwardly from the leading edge 103 toward the trailing edge 104 of blade 101 at an angle β of approximately 20 degrees. The plate 176 may be provided at its trailing edge with an integral air scoop 180. The air scoop 180 may be angled upwardly of plate 176 at an angle μ of approximately 35 degrees to further divert air and particles upwardly in the manner of air deflector 105. The outboard cutter 175 may effect one or more cuts before grass or other material is engaged by the conventional cutting edge 111 of blade 101. It is thus to be appreciated that blade 101, with the outboard cutter 175 features shown and described herein, provides multi-level cutting when in operation on a moving mower.

Figure 15:
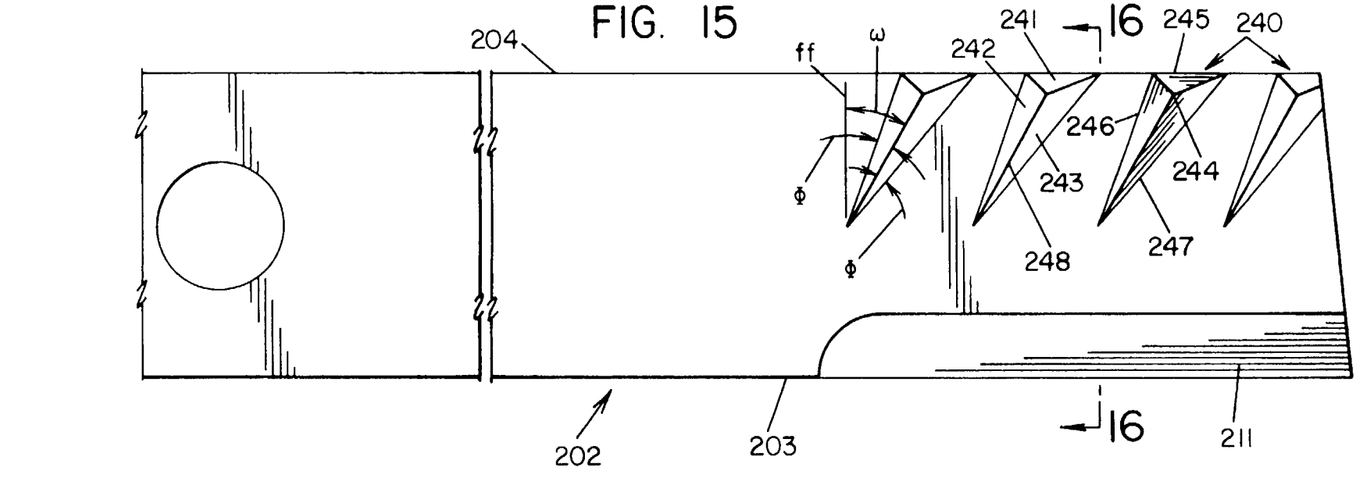
FIG. 15 is a plan view of a brush cutter blade according to a further embodiment of the present invention showing a different shredder configuration and positioning.
Figure 16:
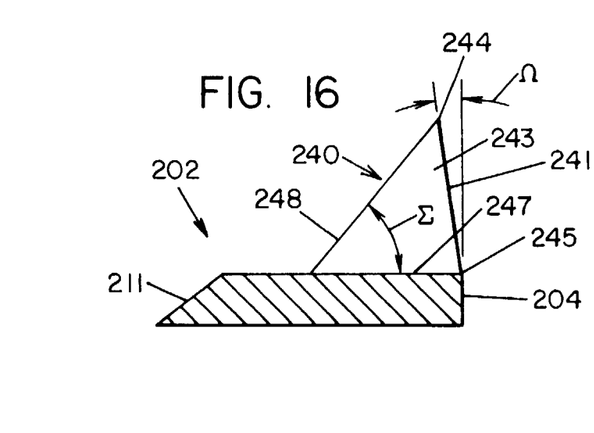
FIG. 16 is a cross-sectional view of the blade of FIG. 15 taken substantially along the line 16—16 of FIG. 15 showing additional details of the shredders.

Referring now to FIGS. 15 and 16, there is shown an alternate form of the brush cutter blade described above in conjunction with FIGS. 4a and 4b of the drawings. As shown, the brush cutter blade 202 has a plurality of shredders, generally indicated by the numeral 240, positioned on the upper surface thereof. The shredders 240 are preferably located behind the conventional cutting edge 211 which is on the leading edge 203 of the blade 202. The shredders 240 are spaced at intervals longitudinally of blade 202 and may be proximate to the trailing edge 204, as shown.

The shredders 240 which are atop the blade 202 are generally raised pyramids having upstanding triangular sides 241, 242, and 243, which meet at an apex 244. The surface of blade 202 meets sides 241, 242, and 243 at lines of intersection 245, 246, and 247, respectively, to define a triangular base. Sides 242 and 243 meet at a line of intersection which constitutes the cutting edge 248 for the shredders 240. The shredders 240 are preferably formed integral with the blade 202 by casting or forging operations.

The cutting edge 248 slants upwards and rearward toward the trailing edge 204 of the blade 202 and is oriented at an angle Σ of approximately 45 degrees with respect to the plane of the blade 202. The cutting edge 248 is also preferably oriented at an angle ω of approximately 30 degrees with respect to a line ff perpendicular to the edges 203, 204 of the blade 202 through the intersection of cutting edge 248 and blade 202. The lines 245 and 246 of sides 242 and 243 extend from the point of intersection of lines 245 and 246 at angles Φ of approximately 10 degrees to either side of the cutting edge 248. The side 241 may taper upwardly and slightly forwardly of the trailing edge 204 of blade 202 through a small angle Ω of a few degrees, as best seen in FIG. 16. The blade 202 is thus provided with rigid, substantial shredders 240 for cutting and shredding relatively heavy brush.

With the use of the improved rotary mower blade of this invention, it has been found that a layer of leaves three feet deep is reduced to dust, fines and shredded cuttings ¾" in size and smaller with one mowing. Without the shredders of this invention, an ordinary rotary blade would produce cuttings 3 to 4" long. The shredding is accomplished by the additional cutting edges of the shredder of this invention while the clippings are being lifted to the discharge opening of the mower.

While only a limited number of embodiments has been described and shown herein, these are to be considered exemplary only, and numerous modifications may be made within the scope of the present invention which is to be limited only by the scope of the following claims.

What is claimed is:

1. A rotary blade for a power lawn mower having a leading edge and a trailing edge proximate each end comprising, a plurality of shredders, each said shredder having a plate formed integrally with the blade and extending angularly upwardly and generally longitudinally of the blade, and a cutting edge on each said plate facing the leading edge of the blade, said cutting edge extending upwardly of the blade and rearwardly toward the trailing edge of the blade, and said shredders being arranged in a plurality of rows extending generally longitudinally of the blade.

2. A rotary blade according to claim 1, wherein said cutting edges of said shredders in one of said rows are positioned longitudinally intermediate the cutting edges of said shredders in other of said rows.

3. A rotary blade according to claim 1, wherein one of said rows of said shredders is positioned along the trailing edge of the blade.

4. A rotary blade according to claim 3, wherein said one of said rows of said shredders is positioned in an air deflector formed integrally with the blade and extending upwardly to the trailing edge of the blade at an angle of approximately 30 to 40 degrees.

5. A rotary blade for a power lawn mower according to claim 3, wherein said shredders have said plates inclined inwardly and upwardly of the blade.

6. A rotary blade for a power lawn mower according to claim 5, wherein said plates are inclined upwardly at an angle of approximately 30 degrees with respect to the plane of said air deflector.

7. A rotary blade for a power lawn mower according to claim 1 further comprising, an outboard cutter positioned at the end of the blade and extending outwardly and upwardly relative to the plane of the blade.

8. A rotary blade for a power lawn mower having a leading edge, a trailing edge, and cutting edge over a portion of the leading edge at each end thereof comprising, combined means for shredding and deflecting air at each trailing edge of the blade including a substantially planar upwardly inclined air deflector surface proximate the trailing edge, a plurality of plates at spaced longitudinal intervals along said air deflector extending axially upwardly and longitudinally of said air deflector, and a cutting edge on said plates facing the leading edge of the blade and extending upwardly of said air deflector and rearwardly toward the trailing edge of the blade.

9. A rotary blade for a power lawn mower according to claim 8, wherein said plates are inclined upwardly at an angle of approximately 30 degrees with respect to the plane of said air deflector.

10. A rotary blade for a power lawn mower according to claim 8, wherein said plate is oriented upwardly and rearwardly at an angle of approximately 20 to 30 degrees with respect to a line perpendicular to the leading and trailing edges of the blade.

11. A blade for a power mower or brush cutter having a leading edge and a trailing edge proximate each end comprising, a plurality of shredders formed integrally with the blade and spaced at intervals longitudinally thereof, each shredder being positioned atop the blade and having the form of a solid raised pyramid, and two sides of said pyramid intersecting to form an upstanding cutting edge extending from atop the blade at the juncture of said two sides of said pyramid to the apex thereof, said cutting edge being angularly oriented from a position between the leading edge and the trailing edge of the blade in a direction toward the trailing edge and the end of the blade.

12. A blade according to claim 11, wherein said cutting edge slants upwardly from and rearwardly toward the trailing edge of the blade.

13. A blade according to claim 12, wherein said cutting edge is oriented at an angle of approximately 45 degrees with respect to the plane of the blade.

14. A blade according to claim 13, wherein said cutting edge is oriented at an angle of approximately 30 degrees with respect to a line perpendicular to the leading and trailing edges of the blade.

15. A blade according to claim 11, wherein said two sides of said pyramid meet the blade at lines of intersection positioned at angles of approximately 10 degrees with respect to said upstanding cutting edge.

16. A blade according to claim 11, wherein said apex of said pyramid is positioned above the blade.

17. A blade according to claim 11, wherein said pyramid has a third side joining said two sides and meeting the blade at a line of intersection substantially paralleling the leading and trailing edges of the blade.

18. A blade according to claim 17, wherein said third side meets the blade at substantially the trailing edge thereof and is upwardly and forwardly inclined from the trailing edge of the blade.

* * * * *